United States Patent [19]

Lebret

[11] 4,395,069

[45] Jul. 26, 1983

[54] PINCERS-TYPE GRIPPER FOR SEIZING OBJECTS AND GRIPPING HEAD EQUIPPED WITH SUCH GRIPPERS

[75] Inventor: Gérard Lebret, Dompierre sur Avre, France

[73] Assignee: E. P. Remy et Cie., Dreux, France

[21] Appl. No.: 290,506

[22] Filed: Aug. 6, 1981

[30] Foreign Application Priority Data

Sep. 30, 1980 [FR] France ............... 80 20941

[51] Int. Cl.³ .............................................. B25J 15/00
[52] U.S. Cl. ............................. 294/87.22; 294/116
[58] Field of Search ............. 294/87 R, 87.2, 87.22, 294/87.24, 88, 90, 100, 106, 110 R, 115, 116

[56] References Cited

U.S. PATENT DOCUMENTS

| 583,604 | 6/1897 | Phinney | 294/115 X |
|---|---|---|---|
| 1,523,063 | 1/1925 | Fuchs | 294/115 X |
| 2,799,414 | 7/1957 | Streckfuss | 214/309 |
| 3,069,035 | 12/1962 | Schwarz et al. | 294/87.22 X |
| 3,267,643 | 8/1966 | Dardaine | 294/90 X |
| 4,116,325 | 9/1978 | McDonald | 294/116 X |
| 4,169,621 | 10/1979 | McGill | 294/116 |
| 4,211,123 | 7/1980 | Mack | 294/116 X |

FOREIGN PATENT DOCUMENTS

| 1197207 | 7/1965 | Fed. Rep. of Germany . |
|---|---|---|
| 740245 | 11/1955 | United Kingdom . |
| 1456703 | 11/1976 | United Kingdom ............... 294/88 |

Primary Examiner—Johnny D. Cherry
Attorney, Agent, or Firm—Kenyon & Kenyon

[57] ABSTRACT

A pincers-type gripper for seizing bottles includes an operating rod provided with a pin extending transversely to the rod and each end of which is loosely fitted in an aperture provided in each jaw, each aperture including two internal cam surfaces contacting the ends of the pin to allow the jaws to be moved towards or from one another when the operating rod is actuated.

6 Claims, 4 Drawing Figures

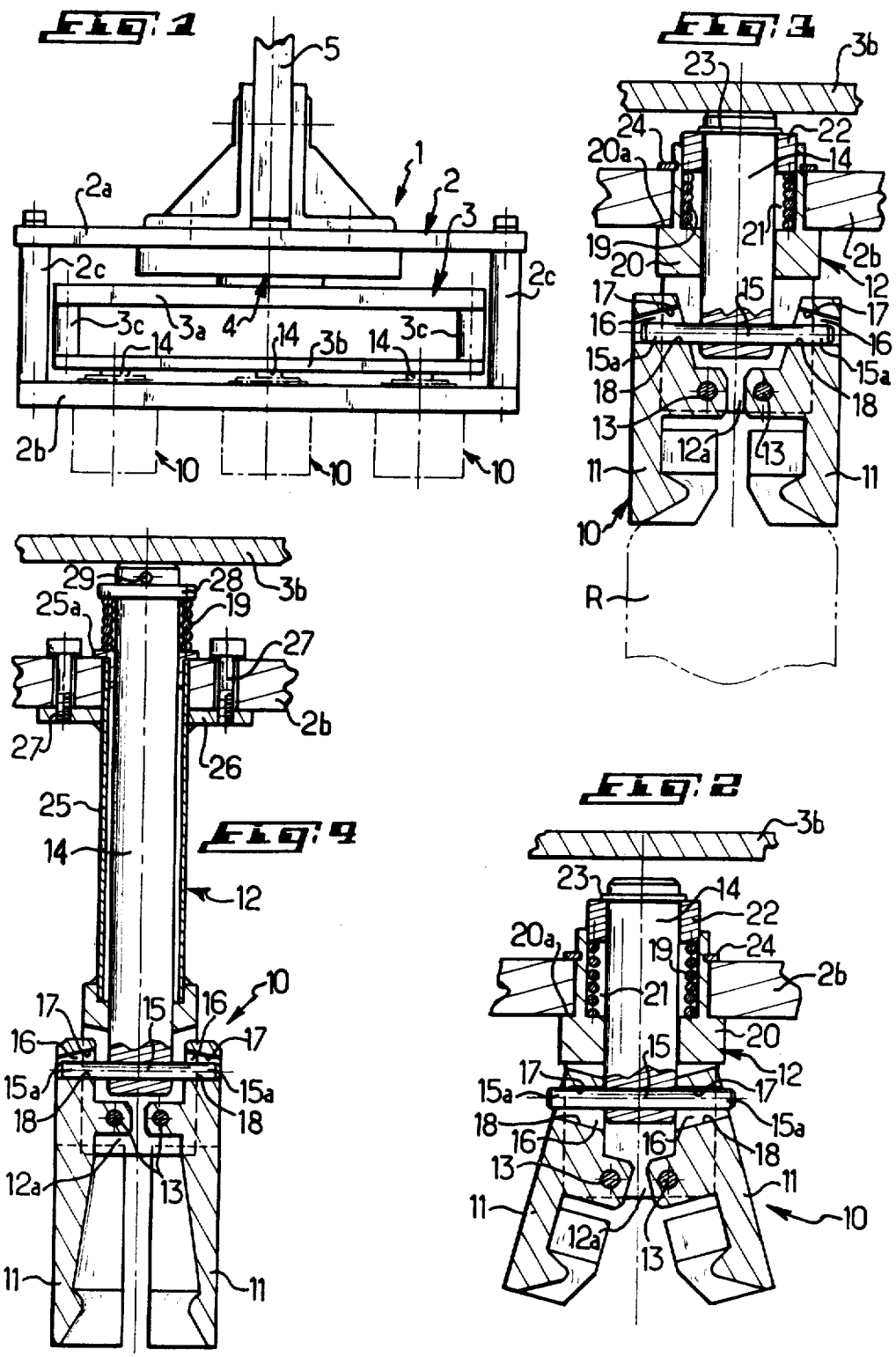

PINCERS-TYPE GRIPPER FOR SEIZING OBJECTS AND GRIPPING HEAD EQUIPPED WITH SUCH GRIPPERS

The present invention has essentially for a subject matter a pincers-type gripper member intended for mechanical handling of elongate objects such as for example containers or vessels in the form of bottles, flasks or the like which must, for example, be encased or uncased automatically.

The invention is also directed to container gripping heads equipped with a plurality of such grippers.

Gripping heads have already been proposed which are equipped with means for automatically seizing and releasing containers, each said means being generally in the form of a bell containing an appropriate mechanism for seizing or releasing at will, for example, bottle necks.

However, such seizing bells cannot always be manufactured as conveniently as desirable and remain expensive. This has led the applicant to design a variant of the gripping system already proposed, resulting in a novel pincers-type gripper for seizing containers, which structurally remains particularly simple and reliable and generally possesses all the desired qualities for convenient and inexpensive manufacture.

To this end, the invention provides a pincers-type gripper for seizing elongate objects such as for example containers or vessels in the form of bottles, flasks or the like, of the type comprising essentially a set of hinged jaws actuated by an operating rod, wherein the said operating rod includes one end portion extending between the jaws and being provided with at least one pin, stud or the like extending transversely to the operating rod and each end of which is loosely fitted in an aperture provided in each jaw, respectively, and the said aperture of each jaw has an internal profile which allows the jaws to be moved towards or from one another by co-operating with the ends of the pin during the actuation of the operating rod.

According to another characterizing feature of the invention, the aforesaid aperture of each jaw comprises two opposite pin-contacting inner cam surfaces at an angle to one another.

As will be seen later, at the end of the movement of the jaws towards or from one another, the said pin-contacting cam surfaces are parallel with the axis or generating lines of the pin jointly movable with the operating rod, thus advantageously ensuring a positive opening or closing of the gripper.

According to another characterizing feature of the invention, the said jaws are each hingedly mounted within a clevis portion provided at the end of the stationary support for the gripper.

It will be noted that the said operating rod slidingly traverses the said stationary support and permanently urges the jaws to their open position through the medium of a return means such as for example a spring.

The stationary support of the gripper may be provided with a recess accommodating the said spring arranged between and bearing on the bottom of the said recess and a spring-retaining ring engaged on the operating rod.

According to another form of embodiment, the said stationary support is constituted by a sleeve, whereas the spring is arranged between the end of the said sleeve and a spring-retaining ring or the like engaged on the operating rod.

According to still another characterising feature of the invention, the internal shape of the free end of the jaws is complementary to the shape of the seized end of the container, and the outer dimension of the jaws in the open position is substantially equal to the largest outer dimension of the container body.

There is thus advantageously obtained a minimum size of the gripping heads equipped with grippers according to the invention.

The invention is also generally directed to a gripping head equipped with a plurality of pincers-type grippers complying with the aforementioned characterizing features, the said head comprising particularly a frame to which are secured the aforementioned stationary supports and which is also provided with a mechanism for pushing the operating rods of the grippers.

It will also be noted that the said stationary support of each gripper is mounted on and traverses a plate or the like assembled to the said gripping head frame.

Other characterizing features, details and advantages of the invention will appear more clearly from the following detailed description made with reference to the appended drawings given solely by way of example and wherein:

FIG. 1 is a partial diagrammatic elevational view of a gripping head equipped with pincers-type grippers according to the invention;

FIG. 2 is an elevational view, partially in vertical section, of a gripper in open position;

FIG. 3 is a view similar to FIG. 2 but showing the gripper in closed position; and FIG. 4 is an elevational view, in partial vertical section, of another form of embodiment of the gripper according to the invention.

Referring to FIG. 1, there is seen a head 1 for gripping containers, vessels or the like, which may be connected through the medium of a bar 5 to any machine (not shown) such as for example a conveyor driving the gripping head 1. The gripping head 1 comprises a stationary frame 2 and a movable frame 3 within the frame 2.

As seen clearly in FIG. 1, the stationary frame 2 is made up essentially of plates 2a, 2b connected by spacers or crossbars 2c, a lower plate 2b supporting the grippers according to the invention as shown diagrammatically at 10. The movable frame 3 also is made up of plates 3a and 3b assembled together by means of spacers or cross-bars 3c, the lower plate 3b being intended for the closing of the grippers 10 as will be seen later. At 4 is diagrammatically shown a device for operating the movable frame 3, therefore for actuating the grippers 10, which device does not form part of the present invention and may consist for example of a rotary ratchet and lever gearing of a type known per se.

According to one example of embodiment, and referring to FIGS. 2 and 3, a pincers-type gripper 10 according to the invention comprises essentially a set of jaws 11, two in number in the example considered, hingedly connected at 13 to a stationary support 12 and the opening and closing of which are performed by an operating rod 14 which is also seen in FIG. 1.

More precisely, there is provided in proximity to the end portion of the operating rod 14 extending between the jaws 11 a transverse pin, stud or the like 15, each end 15a of which is loosely contained in an aperture 16 provided in the upper portion of each jaw 11. As seen clearly in FIGS. 2 and 3, the internal profile of each aperture 16 is such that the aperture has two inner cam-surfaces 17, 18 contacting the ends 15a of the pin 15. The inner cam-surfaces 17, 18 are not parallel, i.e., they are arranged at an angle to one another so as to allow the opening and closing of the jaws 11 under the action of the operating rod 14 as will be explained later in describing the operation of the grippers.

As appears clearly from the Figures, the operating rod 14 slidingly traverses the stationary support 12 and is permanently urged upward by a spring 19 to the open position of the jaws 11.

The jaws are hinged at 13 by means of pins, studs or the like traversing a clevis 12a which, as seen clearly in the Figures, constitutes the lower end of the stationary support 12 of the gripper 10. It should be noted, in this connection, that the stationary support 12 for the gripper 10 is secured to the stationary frame 12 of the gripping head 1, more precisely to the plate 2b of the said stationary frame.

Everything described in the foregoing applies both to the form of embodiment of the gripper illustrated in FIGS. 2 and 3 and the one shown in FIG. 4 using the same reference numerals.

According to the form of embodiment of FIGS. 2 and 3, the stationary support 12 of the gripper 10 comprises an upper portion 20 with a recess 21 accommodating the spring 19. More precisely, the spring 19 is arranged between and bears upon the bottom of the recess 21 and a ring, washer or the like 22 retained by a circlip 23 on the operating rod 14. At 24 is shown another circlip which retains the gripper 10 assembled to the stationary ring 2. More precisely, the upper portion 20 of the stationary support 12 of the gripper traverses the plate 2b of the stationary frame 2 of the gripping head 1 and bears by a shoulder 20a against the said plate 2b while being retained on the latter by the circlip 24. As seen in FIGS. 2 and 3, the jaws 11 are relatively short and particularly adapted for encasing or uncasing bottles, when the handling containers used are bottle crates of the box type.

According to another form of embodiment illustrated in FIG. 4, the jaws 11 are greater in length and intended for use mainly when the bottles to be handled are placed in crates provided with partition or separating walls. According to this form of embodiment, wherein the operating rod 14 is longer than the one seen in FIGS. 2 and 3, use is made, as the upper portion of the stationary support 12, of a sleeve 25 in which is slidingly mounted the rod 14. The sleeve 25 is assembled to the plate 2b of the stationary frame 2 of the gripping head 1 by means of a plate 26 traversed by screws 27. More precisely, the upper end of the sleeve 25 is provided with a flange 25a against which is tightly fixed the plate 26 so as to rigidly assemble the gripper 10 to the stationary frame 2b.

In this case, the spring 19 is arranged between and bears on the flange 25a of the sleeve 25 and a circlip 28 fastened by means of a pin 29 to the operating rod 14.

To be noted here is the fact that the internal shape of the gripper 10 in the form of embodiment illustrated in FIGS. 2 and 3 and in that of FIG. 4 is complementary to the neck of the container R to be handled. But, whatever the case may be, the outer dimension of the free end of the jaws is advantageously and preferably substantially equal to the largest outer dimension of the containers R. The advantage of this is readily understood where a gripping head such as 1 is to be equipped with a plurality of grippers according to the invention.

There will now briefly be described the operation of the grippers 10 which, besides, is the same in both forms of embodiment illustrated in FIGS. 2, 3 and 4, respectively.

Starting from FIG. 2, it is seen that the jaws 11 are open since the operating rod 14 is urged upward and the plate 3b of the frame 3 is not in contact with the end of the rod 14. The gripping of the bottles placed for example in a board box is performed by actuating the movable frame 3 to cause the plate 3b to bear upon the operating rod 14 to thus close the jaws 11 as seen clearly in FIGS. 3 and 4. Thus, containers R such as for example bottles or flasks, are seized to be for example transferred further and then released by again actuating the movable frame 3.

It is important, at this point, to emphasize the function of the contact cam-surfaces 17 and 18 of each aperture 16 cooperating with the free ends 15a of the transverse pin 15 jointly movable with the operating rod 14. Indeed, as clearly seen in FIGS. 3 and 4, when the jaws 11 are in closed position, the pin 15 is parallel to the contact surfaces 18 and bears thereon so as to ensure a positive closing of the jaws 11. On the contrary, when the operating rod 14 is acted upon by the spring 19, the ends 15a of the pin 15 bear on the contact surfaces 17 thus moving the jaws 11 from one another until the surfaces 17 are parallel with the axis of the pin 15, the jaws 11 in this position being open at a given angle to one another depending on the incline of the contact surface 17 as seen clearly in FIG. 2. Otherwise stated, the angle between inner cam-surfaces 17, 18 of each aperture 16 is such that cam-surface 17 is parallel to the axis of pin 15 when the jaws 11 are opened and that the other cam-surface 18 is parallel to the axis of pin 15 when the jaws 11 are closed. The above is therefore a particularly simple and reliable mechanical system which ensures accurate closing and opening of the grippers.

Of course, the invention is by no means limited to the forms of embodiment described and illustrated which have been given by way of example only.

On the contrary, the invention comprises all technical equivalents to the means described as well as their combinations if the latter are carried out according to its gist and used within the scope of the claimed protection.

What is claimed is:

1. A gripper for seizing elongated objects such as bottles, the gripper comprising:
    stationary support means having a central axis extending between a clevis end portion and an opposite end;
    a set of jaws hingedly mounted in said clevis end portion, each jaw being rotatable between an open position and a shut position about a respective pivot axis spaced from and lying in a plane perpendicular to said central axis;
    an operating rod slidably disposed in said stationary support coaxial with said central axis, said operating rod having a first end portion extending between said jaws and a second end portion;
    an actuating member fastened to said operating rod adjacent said first end and extending transversely to said rod, each of said jaws having an aperture loosely receiving said actuating member, the actuating member having two lateral contact surfaces parallel to each other, and the aperture of each jaw having a planar opening cam surface and an opposed planer closing cam surface, said cam surfaces being non-parallel and extending at an angle such that said opening cam surface is parallel to the contact surfaces of the actuating member when the jaws are in the open position and said closing cam surface is parallel to the contact surfaces of the actuating member when the jaws are in the shut position;

stop means fixed on said operating rod; and spring means disposed between the stationary support means and said stop means and urging the operating rod in the direction such that one contact surface of the actuating member bears against the opening cam surfaces of said jaws for urging the jaws to said open position.

2. A gripper according to claim 1 wherein the apertures of each jaw are located between the respective pivot axis and said opposite end of the stationary support means.

3. A gripper according to claim 1 wherein at least portions of the cam surfaces of said jaw apertures are located further away from the central axis than said pivot axes.

4. A gripper according to claim 3 wherein the spacing between the planar cam surfaces of each jaw decreases with increasing distance from said central axis.

5. A gripper according to claim 1 wherein said stop means is located adjacent to the second end of said operating rod, such that the spring means urges the operating rod away from the clevis end portion of the stationary support means.

6. A gripper head for seizing a plurality of containers such as bottles, the gripping head being equipped with a plurality of grippers according to claim 1, said gripping head further comprising:

a frame having stationary plate means, the opposite end of the stationary support means of each gripper being fastened to said stationary plate means;

second plate means movable within said frame for actuating the operating rod of each gripper; and means for moving said second plate means within said frame.

* * * * *